United States Patent
Yao et al.

(10) Patent No.: US 11,132,575 B2
(45) Date of Patent: *Sep. 28, 2021

(54) COMBINATORIAL SHAPE REGRESSION FOR FACE ALIGNMENT IN IMAGES

(71) Applicant: INTEL CORPORATION, Santa Clara, CA (US)

(72) Inventors: Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,827

(22) Filed: Dec. 11, 2019

(65) Prior Publication Data

US 2020/0117936 A1    Apr. 16, 2020

Related U.S. Application Data (63) Continuation of application No. 15/573,631, filed as application No. PCT/CN2015/082543 on Jun. 26, 2015, now Pat. No. 10,528,839.

(51) Int. Cl.
G06K 9/32       (2006.01)
G06K 9/00       (2006.01)
G06K 9/62       (2006.01)

(52) U.S. Cl.
CPC ....... *G06K 9/3216* (2013.01); *G06K 9/00241* (2013.01); *G06K 9/00248* (2013.01);
(Continued)

(58) Field of Classification Search
CPC ....... G06K 2009/3291; G06K 9/00241; G06K 9/00248; G06K 9/00275; G06K 9/00288; G06K 9/3216; G06K 9/621
See application file for complete search history.

(56) References Cited

U.S. PATENT DOCUMENTS

| 8,805,018 B2 | 8/2014 | Li et al. |
| 2008/0187213 A1 | 8/2008 | Zhang et al. |

(Continued)

FOREIGN PATENT DOCUMENTS

| CN | 103503029 A | 1/2014 |
| CN | 104050628 | 9/2014 |
| WO | 2016206114 A1 | 12/2016 |

OTHER PUBLICATIONS

International Search Report and Written Opinion received for PCT/CN2015/082543, dated Dec. 25, 2015. 8 pages.

(Continued)

*Primary Examiner* — Ian L Lemieux
(74) *Attorney, Agent, or Firm* — Hanley, Flight & Zimmerman, LLC (57) ABSTRACT

Combinatorial shape regression is described as a technique for face alignment and facial landmark detection in images. As described stages of regression may be built for multiple ferns for a facial landmark detection system. In one example a regression is performed on a training set of images using face shapes, using facial component groups, and using individual face point pairs to learn shape increments for each respective image in the set of images. A fern is built based on this regression. Additional regressions are performed for building additional ferns. The ferns are then combined to build the facial landmark detection system.

30 Claims, 7 Drawing Sheets

(52) U.S. Cl.
CPC ..... *G06K 9/00275* (2013.01); *G06K 9/00288* (2013.01); *G06K 9/621* (2013.01); *G06K 2009/3291* (2013.01)

(56) References Cited

U.S. PATENT DOCUMENTS

| | | | |
|---|---|---|---|
| 2014/0050358 | A1 | 2/2014 | Liu et al. |
| 2014/0185924 | A1 | 7/2014 | Cao et al. |
| 2015/0035825 | A1* | 2/2015 | Zhou ................... G06T 13/40 345/419 |
| 2015/0125072 | A1 | 5/2015 | Mitarai et al. |
| 2015/0169938 | A1 | 6/2015 | Yao et al. |
| 2015/0186748 | A1 | 7/2015 | Cootes et al. |
| 2016/0055368 | A1* | 2/2016 | Cao ..................... G06K 9/6206 382/195 |
| 2017/0061253 | A1* | 3/2017 | Burgos ................. G06T 7/70 |
| 2017/0286759 | A1* | 10/2017 | Yao ................... G06K 9/00315 |
| 2017/0286801 | A1* | 10/2017 | Rampal ............. G06K 9/00261 |
| 2018/0018503 | A1 | 1/2018 | Wang |
| 2019/0318158 | A1* | 10/2019 | Qin ................... G06K 9/00281 |
| 2020/0327368 | A1* | 10/2020 | Ambai ................. G06K 9/6232 |

OTHER PUBLICATIONS

International Preliminary Report on Patentability received for PCT/CN2015/082543, dated Dec. 26, 2017. 6 pages.

United States Patent and Trademark Office, "Notice of Allowance and Fee(s) Due," issued in connection with U.S. Appl. No. 15/573,631 dated Aug. 30, 2019, 9 pages.

United States Patent and Trademark Office, "Non Final Office Action," issued in connection with U.S. Appl. No. 15/573,631 dated Mar. 11, 2019, 13 pages.

Zhou et al., "Extensive Facial Landmark Localization with Coarse-to-find Convolutional Network Cascade," 2013 IEEE International Conference on Computer Vision Workshops, Dec. 2013, (6 pages).

Burgos-Artizzu et al., "Robust Face Landmark Estimation Under Occlusion," 2013 IEEE International Conference on Computer Vision, Dec. 2013, (8 pages).

China National Intellectual Property Administration, "First Office Action," issued in connection with Chinese patent application No. 201580080380.7, dated Apr. 1, 2021, (8 pages).

* cited by examiner

COMBINATORIAL SHAPE REGRESSION FOR FACE ALIGNMENT IN IMAGES

This application is a continuation of U.S. patent application Ser. No. 15/573,631, filed Nov. 13, 2017, the disclosure of which is incorporated by reference herein in its entirety.

FIELD

The present description relates to determining face alignment for a still or video image and, in particular, using a regression based on training.

BACKGROUND

With the proliferation of digital cameras in portable, ruggedized, and desktop devices, there is a related desire to use these cameras in new ways. Some of these ways work with faces that are within the camera's field of view. By recognizing and interpreting faces, many new functions are provided, such as identifying a known user, interpreting a user's expressions as commands or as other input, mapping a user's expressions to an avatar for a chat session, determining whether a user is paying attention to something in the user's field of view, and more. By recognizing a face, a computing system may be able to apply digital makeup, hairdos, hats, clothing, and other fashion looks. Two and three-dimensional face mesh generation may be performed as well as many other augmented imaging functions. These functions are useful in portable and wearable devices, such as smart phones, action cameras, and headsets and are also useful in notebook, desktop, gaming, and entertainment systems.

In many techniques, in order to recognize and interpret faces, first a face region is identified. This may be done for a single image or for a sequence of images in a video. The images may be two or three-dimensional. Once a system determines that a particular region may have a face, then the alignment of the face is determined. Face alignment is a technique to locate the positions of a set of semantical facial landmark points, such as ears, eyes, nose, mouth, chin and cheeks. These facial landmark points may then be used to determine the direction toward which the head is facing, to track eye movements, to recognize or distinguish two different faces and more. Face alignment is used in many computer vision systems including face recognition, facial feature tracking, and animation.

Face alignment is made difficult because of the differences between faces of different people and because of the differences caused when a single person changes expressions. Another difficulty comes when a person turns the head or when a head is partially blocked or occluded or blocked by another person or an object. Face alignment is also made difficult by variations in backgrounds behind a face and illumination around the face.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A facial landmark model is generated by training and then new images may be fitted to the model by applying a fern regression through the trained features. A multiple stage regression may have a fern at each regression stage. Through the training the system learns cascaded ferns capturing variations in the appearance of and geometric relationship of facial landmarks. Once the facial landmarks are quickly and reliably identified, a variety of different operations may be performed such as face recognition, facial feature tracking, gaze estimation, expression or mood determination, etc.

A face alignment technique is described herein with an efficient regression for quick convergence and also with a fine grained discrimination of features. To this end, CSR (Combinatorial Shape Regression), as described herein, is used as a coarse-to-fine regression method. The described CSR approach flexibly combines holistic face shape driven global regression, facial component driven group regression and individual point-pair driven local regression into a unified framework. In addition to the CSR, PPIIF (Point-Pair Indexed Image Features) are used by considering geometric relationships among landmark point-pairs. The PPIIFs introduce geometric-invariant constraints in a process of progressively learning shape increments. By integrating PPIIFs into a framework of CSR, a completely new face alignment technology is presented.

As described herein, an accurate and fast shape alignment is obtained using a Combinatorial Shape Regression (CSR) together with Point-Pair Indexed Image Features (PPIIFs). This technique does not rely on a direct global or local regression. The techniques described may be considered in terms of three aspects: (1) CSR, a regression composition, which combines holistic face shape driven global regression, facial component driven group regression and individual point-pair driven local regression into a unified framework, this provide a coarse to fine face alignment process; (2) progressively learning shape increments by using geometric-invariant constraints in a procedure for considering geometric relationships among landmark point-pairs. PPIIFs, this provides a better capability for handling complex variations in face pose, facial expression, partial occlusion, etc.; (3) integrating PPIIFs into CSR to greatly reduce cascaded stages for convergence in training. In many implementations, only hundreds of cascaded stages are used while other techniques may need thousands of cascaded stages.

A basic shape regression method may be augmented with an additive cascade consisting of K stages. A feature mapping function $F_k$ and a linear weighting function $W_k$ may be learned by applying iterations to training data. After establishing these two functions, then, given a face image I and an initial face shape $S_0$ consisting of a set of P semantic facial landmark points $\{(x_1, y_1), (x_2, y_2), \ldots, (x_P, y_P)\}$, the target face shape $S_{est}$ can be directly calculated as follows:

$$S_{est} = S_0 + \Sigma_{k=1}^{K} \Delta S_k(S_{k-1}, I), \quad (Eq.\ 1)$$

where $\Delta S_k(S_{k-1}, I)$ is the face shape increment at stage k, and it is calculated according to Equation 2 as follows:

$$\Delta S_k(S_{k-1}, I) = W_k F_k(S_{k-1}, I). \quad (Eq.\ 2)$$

From this definition, it is clear that the performance of such a method directly depends on the progressively learned feature mapping function $F_k$ and linear weighting function $W_k$. To learn them, two objectives may be: (1) designing an efficient regression method for quick convergence: and (2) designing a kind of discriminative feature for a fine-grained partition of the feature space of the training data. These objectives, among others, are satisfied as described below.

1. Combinatorial Shape Regression

Figure 1:
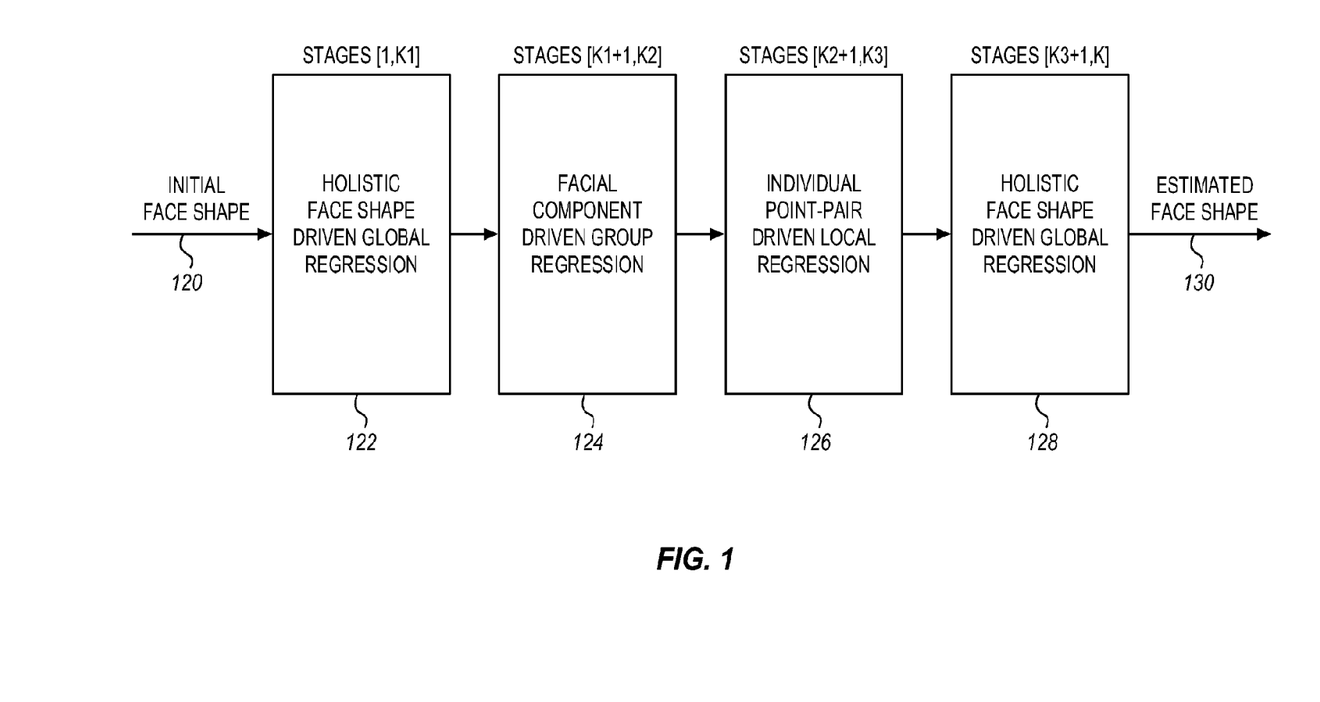
FIG. 1 is a block diagram of a multiple stage regression system according to an embodiment.

FIG. 1 is a simplified block diagram of a cascaded architecture for combinatorial shape regression as described herein. An initial face shape 120 is applied as an input. There are then three kinds of regression strategies HFSDGR (a Holistic Face Shape Driven Global Regression) 122, FCDGR (a Facial Component Driven Group Regression) 124, and IPPDLR (an Individual Point-Pair Driven Local Regression) 126. The IPPLDR is fed back into a second HFSDGR 128 to produce an estimated face shape 130 as an output. As shown, the three types of regression stages may be taken in stages in which the first stage [1, K1] is the HFSDGR, the second stage [K1+1, K2] is the FCDGR, the third stage [K2+1, K3] is the IPPLDR, and the fourth and final stage [K3+1, K] is the second HFSDGR.

Figure 2:
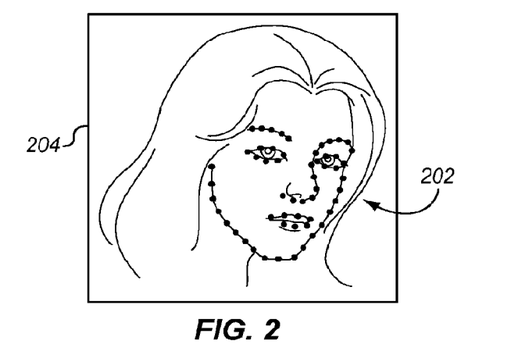
FIG. 2 is a diagram of an example image containing a face with an initial face shape indicated according to an embodiment.
Figure 3:
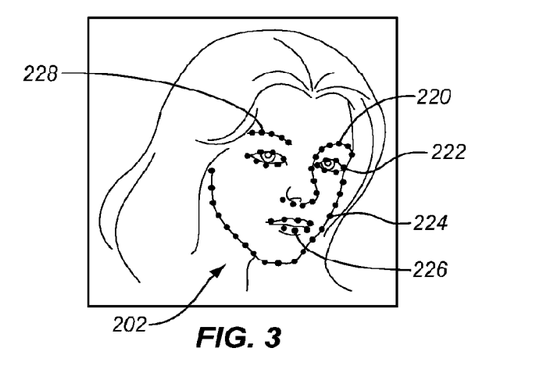
FIG. 3 is a diagram of an example image containing the same face with facial component groups indicated according to an embodiment.
Figure 4:
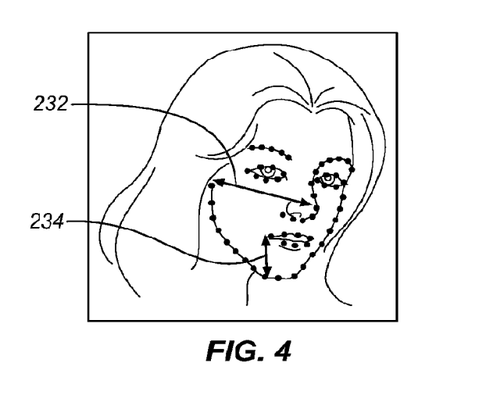
FIG. 4 is a diagram of an example image containing the same face with some point pars indicated according to an embodiment.

The three semantic grouping methods and their application to three respective regression strategies are shown in FIGS. 2-4. FIG. 2 is a diagram of an example image containing a face. An initial face shape 120 has already been provided. In some embodiments, a mean shape over all of the manually annotated training face shape images is used as an initial starting face shape. Alternatively, any face shape from the training images or any randomly sampled linear combination of the face shapes from the training images may be used as the initial face shape. Using HFSDGR 122, a holistic shape driven grouping compares this image to the initial image and takes the whole face shape 202 as a single group 204. A learning procedure may be applied that is similar to that of ESR (Explicit Shape Regression).

FIG. 3 is a diagram of the same example image containing the face 202. FCDGR 124 is used as a facial component driven grouping. The regression divides landmarks into a set of semantic groups according to facial components. Each component is separately identified, such as the left eyebrow 220, right eyebrow 228, left eye 222, left cheek 224, lower lip 226, etc. Learning may be done over each sematic group separately. This advances the whole face shape of HFSDGR for more detail and specificity.

FIG. 4 is a diagram of the same example image containing the face 202. IPPDLR 126 is applied by using individual point-pair driven groupings. Each landmark-pair is considered as a group and the learning is done over each automatically selected landmark pair. In this example, there is a first pair from nose to cheek and a second pair from the right corner of the mouth to the chin 234. These are provided as examples. Many more pairs may be used.

In the implementation, the cascaded structure of the CSR has the four pars shown in FIG. 1. HFSDGR 122 is used to quickly obtain a coarse and sufficient face shape in the first $K_1$ stages. Then, FCDGR 124 is applied to refine the face shape in the subsequent $K_2$-$K_1$ stages. Further, IPPDLR 126 is used to fine-tune the face shape in the subsequent $K_3$-$K_2$ stages. Finally, a second HFSDGR 128 with different parameters is used to avoid possible over-fitting in the last K-$K_3$ stages to produce the final estimated face shape. Therefore, this CSR is a very coarse-to-fine face alignment technology. The technology starts coarse with a general shape and progresses through the stages to fine with individual point pairs. By going from coarse to fine in multiple stages, only a few hundred cascaded stages are used in some embodiments to achieve convergence in training. This reduces the size of the final model for the CSR.

2. Point-Pair Indexed Image Features

While the CSR provides a coarse-to-fine face shape regression framework, the PPIIFs described herein provide a fine-grained partition of the feature space of the training data to learn the decision tree and the respective shape increments contained in each regression stage of the CSR. Let $(x_i, y_i)$ and $(x_j, y_j)$ be the positions of the landmark i and j in the face shape S, PPIIF may be defined as an arbitrary point on a line traversing the positions of the two landmarks i and j at positions $(x_i, y_i)$ and $(x_j, y_j)$, respectively.

$$\text{PPIIF}(x_{ij}, y_{ij}) = a(x_i, y_i) + (1-a)(x_j, y_j), \text{ where } a \in R. \quad (Eq.\ 3)$$

Figure 5:
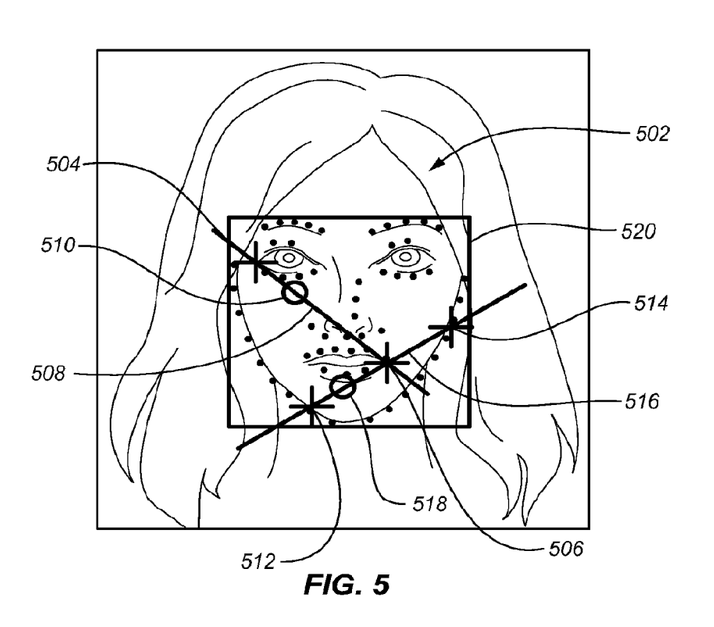
FIG. 5 is a diagram of an example image containing a face with a face region and point-pair indexed image features indicated according to an embodiment.

FIG. 5 is an example image containing a face 502 to show an example application of the PPIIFs. There are two individual point pairs, the first pair uses the right eye 504 as one landmark and the left corner of the mouth 506 as the other landmark. A line 508 is drawn between these and the index 510 is determined on the line 508. A second pair of landmarks is the right chin 512 and left cheek 516. A line is drawn between these two landmarks and an index mark 518 is determined provided by Eq. 3 above.

Figure 6:
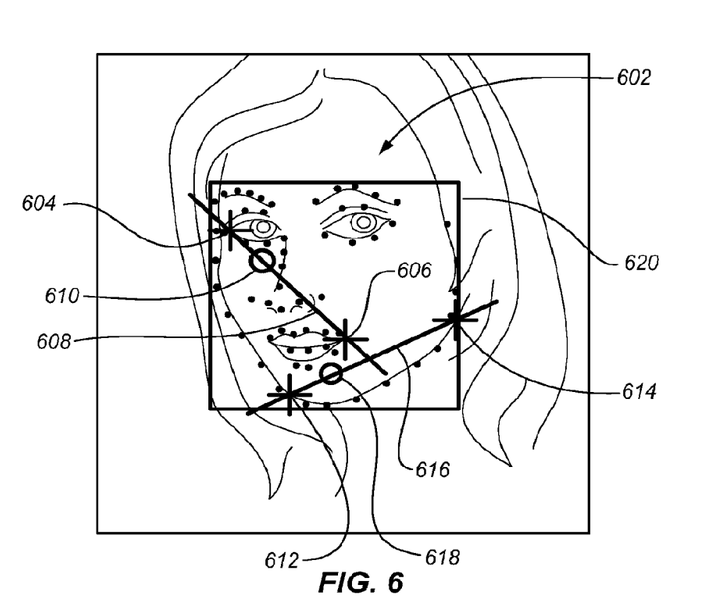
FIG. 6 is a diagram of an example image containing another face with a face region and point-pair indexed image features indicated according to an embodiment.

FIG. 6 is an example of a very different face 602 of a different person in a different position in the image. The same two landmark pairs are used for illustration purposes. The first pair of points is again the right eye 604 as one landmark and the left corner of the mouth 606 as the other landmark. A line 608 is drawn between these and the index 610 is determined. The second pair of landmarks is again the right chin 612 and left cheek 616. A line is drawn between these two landmarks and an index mark 618 is determined.

FIGS. 5 and 6 further show a rectangle 520, 620 surrounding the major features of the face. As shown, the rectangles provide a general size for the identified face. The rectangles may then be used to normalize the faces to a standard size that corresponds to the size of the faces in the training data. In the illustrated example, the faces are about the same size. In other examples, the faces may differ due to distance from the camera or due to different people having different sized faces.

The images and respective face shapes shown in FIGS. 5 and 6 are normalized samples. i.e., they have the same face shape size (as measured by width and height) for the padded image regions to left/right/up/down. The face shapes in actual image may differ in size due to distance from the camera or due to different people having different sized faces or different face poses, etc. In order to more easily recognize facial landmark position the image data may be normalized. In other words, the face size may be normalized before any further operations.

In embodiments, the training source face images are different in size and the respective annotated face shapes are also different in width and height. First a minimal frontal circumscribed rectangle 520, 620 surrounding the landmark points is computed for all of the annotated face shapes. In embodiments, the rectangle is the minimal frontal circumscribed rectangle for each annotated face shape. The rectangle's top left corner is computed as the minimums of horizontal and vertical coordinates of the landmark points, and its bottom right corner is computed as the maximums of horizontal and vertical coordinates of the landmark points.

After determining minimal rectangle, each rectangle may be enlarged in size by padding with some additional size that preserves the aspect ratio. As an example, the height and width may be multiplied by some factor such as 0.5. This maintains the same ratio of height and width while compensating for possible errors in the landmark points. Finally, the images may be cropped to leave only the enlarged face regions. These cropped images may then be normalized to a standard size. In one embodiment, this size may be 256×256. However, the desired size may be selected to suit the desired accuracy and computational resources of a system. With the training data normalized, comparisons are more readily made and the ferns more easily built.

As shown by comparing the examples of FIGS. 5 and 6, the same PPIIFs 510, 518, 610, 618 are obtained in both images despite the obviously different face poses and facial expressions when the landmarks are selected to be at the same positions. The two images also show the same values for a. This is in part because the PPIIFs harness geometric relationships among landmark-pairs. Consequently, PPIIFs may be used to introduce geometric-invariant constraints in the learning procedure and thus achieve a fine-grained partition of the feature space of training data.

Figure 7:
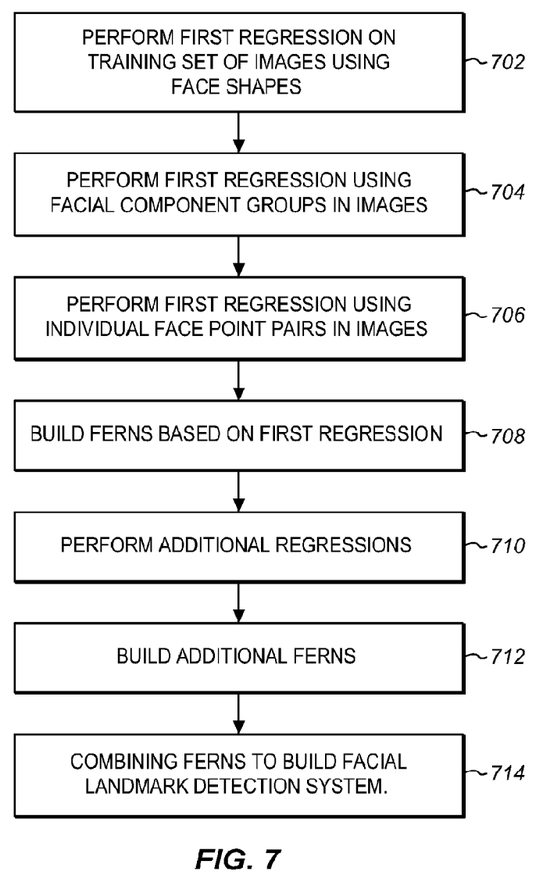
FIG. 7 is a process flow diagram of an image training process according to an embodiment.

FIG. 7 is a process flow diagram of an image training process using some of the principles discussed above including a multiple stage regression. At 702 a first regression is performed on a set of training images using face shapes. This first regression may include learning variations in the appearance of facial landmarks and learning variations in the relationship of facial landmarks. In some embodiments, the regression using face shapes may include calculating shape differences for each image of the set of images as a difference between a normalized ground truth face shape and each face shape of each image. In some embodiments all of the face shape sizes are normalized to a selected standard before any regressions are performed.

At 704 a first regression is performed using facial component groups in images. This may be done in any of a variety of different ways. In some embodiments, facial landmarks are divided into sets of semantic groups according to facial components, where each component is separately identified. Learning is done over each semantic groups separately from each other semantic group.

At 706 a first regression is performed using individual face point pairs in the images of the set of training images. This regression considers geometric relationships among landmark point-pairs. In some embodiments this may be done by using geometric-invariant constraints while progressively learning shape increments. The face point pairs are individual in that the learning may be done over each pair of face points separately from each other pair of face points. As shown in FIGS. 5 and 6, a line may be drawn between two face points of a pair and an index mark on the drawn line may be determined. These parts of the regression may be performed in the described order in which the results complement each other and run from coarse to fine.

After this first regression ferns may be built at 708. At 710 additional regressions are performed and at 712 additional ferns are built. When the regressions are completed at 714, the ferns are combined to build the finished facial landmark detection system.

As in ESR (Explicit Shape Regression), a fern may be used to perform data partition. Each fern is a binary decision tree structure with a set of binary tests. Each image is passed down all of the ferns as it traverses through each stage of the regression. The fern is a composition of some number (N) of features and thresholds (N) that divide the features from all of the training samples into some number of bins, such as $2^N$. Each bin corresponds to a regression output that best matches the new image that is to be identified. However, unlike ESR instead of an original feature, a PPIIF is used. The fern is a binary decision tree which has a composition of N PPIIF pairs. Each PPIIF pair is shared to all of the internal nodes at its respective layer. The data reaching to any internal node are further split into two parts by comparing the gray-level values of a PPIIF-pair.

Figure 8:
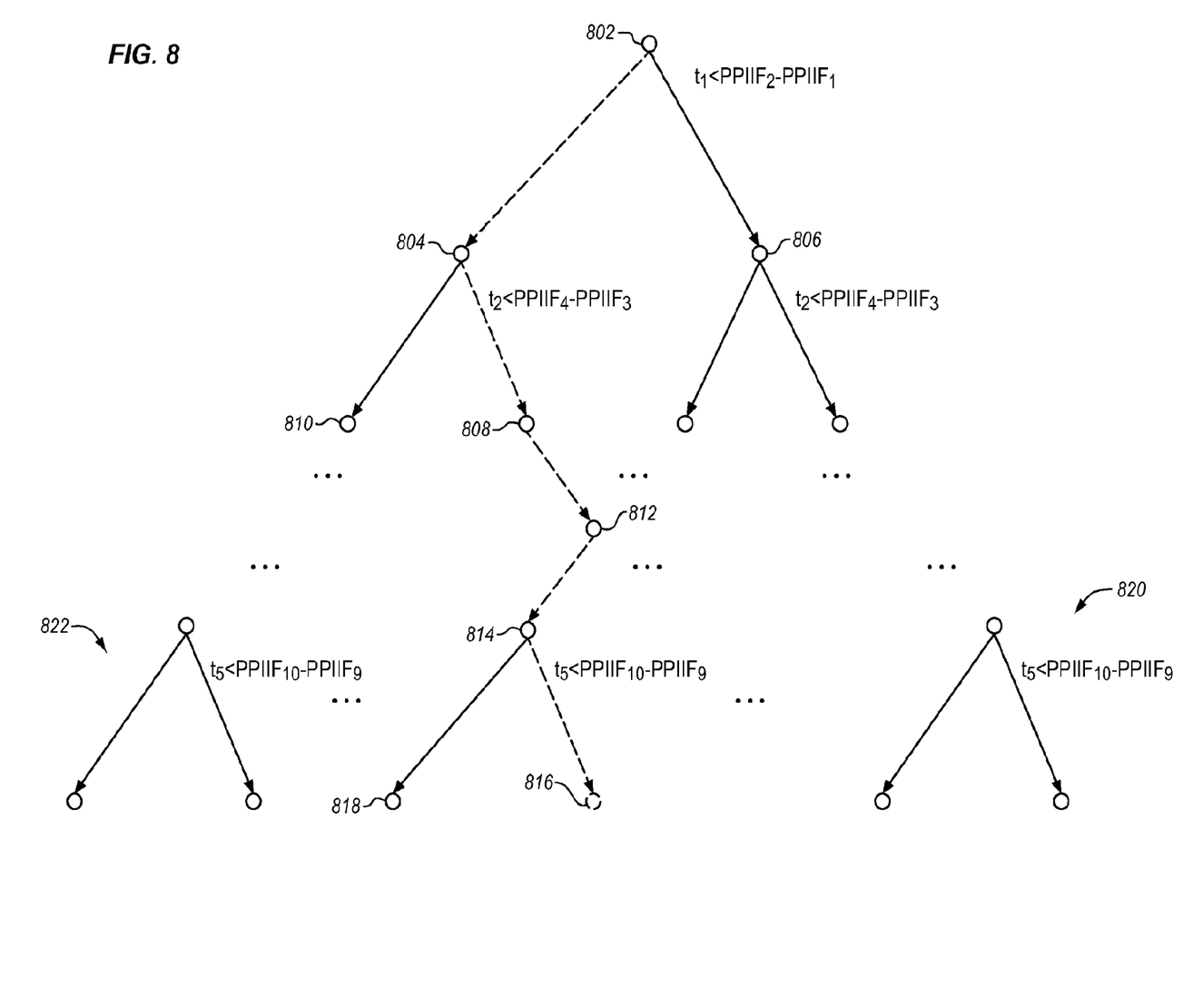
FIG. 8 is a binary decision tree in the form of a fern according to an embodiment.

Accordingly, with a fern containing N PPIIF-pairs, the whole training dataset is divided into $2^N$ bins. This is shown in the example of FIG. 8 with five possible pairs and therefore five stages. The shape increment ($\Delta S_k(n)$) concerning the $n^{th}$ bin can be calculated as in Equation 4 below:

$$\Delta S_k(n) = \frac{\sum_{m \in A_n} (\tilde{S}_m - S_m)}{|A_n|}, \qquad \text{(Eq. 4)}$$

where $A_n$ denotes the training shape samples falling in the $n^{th}$ bin, $\tilde{S}_m$ and $S_m$ denote the ground truth face shape of the $m^{th}$ training sample in $A_n$ and the estimated face shape in the previous step, respectively. Each n of the $\Delta S_k$ values provide a leaf node.

FIG. 8 is a binary decision tree in the form of a fern for applying the point pair indexed image features to selecting a face shape. The root node 802 at layer $t_1$ starts with two landmarks or points, indicated as $PPIIF_1$ and $PPIIF_2$. The intensity of these two points is compared and a partition is performed accordingly. At the next layer 804 designated as $t_2$ points 3 and 4 are compared. A partition is made and the next layer 808 another comparison is made. The system chooses branches from the tree to layers at nodes 812, 814, until reaching the leaf node 816 after layer is by making intensity comparisons or gray-level comparisons through the fern. This leaf node 816 corresponds to a particular bin.

There are many other nodes such as 806, 810, 818, 820, 822 shown in FIG. 8 that are not selected. The nodes may all be pre-sorted using some samples placed into each node to calculate $W_k$ and $S_k$.

3. Learning Shape Increments Using CSR and PPIIFs

The overall process as described above may be summarized as having multiple stages as described below. First there is a training stage. For the training stage a training set T of face image samples $I_l$, are used to set the parameters. The feature mapping function $F_k$ and linear weighting function $W_k$ are determined. PPIIFs are selected, and the binary decision tree is determined using the training data. The training set T may be defined as follows:

$T = \{(S_1(0), I_1, \tilde{S}_1), \ldots, (S_l(0), I_l, \ldots, \tilde{S}_1), \ldots, (S_L(0), I_L, \tilde{S}_1)\}, l = 1, 2, \ldots, L.$ (Eq. 5)

Here, $S_l(0)$ denotes initial face shape, and $\widetilde{S_l}$ denotes the normalized ground truth face shape in face image sample $I_l$.

For the training there are four different stage ranges based on three different threshold values for k, where k designates stages of the process. The first stage is for k=1 to $K_1$ If $1 \leq k \leq K_1$ For this case HFSDGR 122 is used as described above. Accordingly, current shape differences are calculated for all training samples using a difference between the normalized ground truth face shape and each new (k) face shape. This can be expressed as a set of (k) differences as:

$$\Delta S_l(k) = \widetilde{S_l} - S_l(k). \quad (5)$$

Using all of the differences a set of Q candidate PPIIFs may be determined and then a fern may be formulated by choosing the N PPIIFs having the top-N correlations, i.e., the N closest correlations, to the current shape difference set.

Next the shape increments are calculated for all of the bins of the formulated ferns.

Finally the current shapes are updated for all training samples by adding the new shape increments.

The second stage is for the case of k being in the range from $K_1$ to $K_2$.

If $K_1 < k \leq K_2$

For this case FCDGR 124 is used so that the determinations are made with respect to each facial component-driven landmark group separately from each other landmark group.

The operations are otherwise similar to those described above in which current shape differences are first calculated, then candidate PPIIFs are determined to formulate more of the fern using the top correlations to the current shape difference set. The shape increments are calculated and the current shapes are updated.

The third stage is for the case of k being in the range from $K_2$ to $K_3$.

If $K_2 < k \leq K_3$

In this case IPPDLR 126 is used so that the determinations are made with respect to each landmark point-pair. The operations are otherwise similar to those described above for HFSDGR. The current shape differences are first calculated, then candidate PPIIFs are determined to formulate a fern using the top correlations to the current shape difference set. The shape increments are calculated and the current shapes are updated.

The fourth stage is for the case of k being in the range above $K_3$. This stage is a second HFSDGR 128.

If $K_3 < k$

The operations for the first HFSDGR are repeated but now using the more accurate parameters from stages two and three. The result from these four stages is then selected PPIIFs, related ferns and shape increments at all stages Once the training is completed a new image may be analyzed based on the training set using the fern decision tree as described in the context of FIG. 8.

Figure 9:
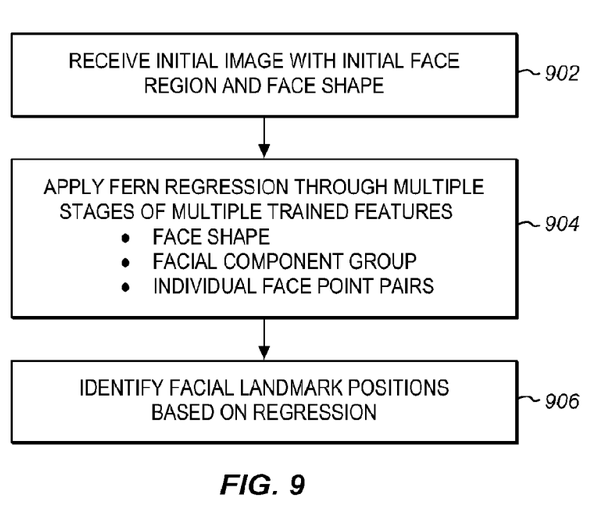
FIG. 9 is a process flow diagram of using a set of ferns for detecting facial landmarks according to an embodiment.

FIG. 9 is a process flow diagram for using a fern decision tree for a facial landmark detection system as described herein. At 902 an initial image is received with an initial face region and face shape. If no face region is found, then the process ends. At 904 a fern regression is applied to the received face shape within the face region through multiple stages of multiple trained features. The face size may be normalized as described above before this is done. The regression may comprise all of the stages described above with respect to FIG. 1, include face shape, facial component group, and individual face point pairs. With each stage of the fern regression, the positions in the image are incremented to new positions to provide a new face shape after each stage. A final face shape driven regression may then be applied. At 906 the facial landmark positions are identified based on the regression A new face alignment method is described herein. The method provides high accuracy, high speed, and low memory use when compared with deformable model-based methods and shape regression-based methods. This method also helps to provide a software stack for vision-based face analytics applications including face recognition, digital face makeup, 2D/3D face mesh generation, facial feature tracking and animation for gaming or avatar video chat, etc. This method also provides a software/hardware stack that complements some advanced camera imaging modules in camera phone platforms. It may also be used in many other applications including, smart phones, tablets, laptops, traditional PCs, and all-in-one and two-in-one devices.

As described herein a regression-based face alignment approach is used in which shape increments are not directly learned from a local or a global regression method. Additive shape increments are instead learned jointly from using holistic face shape-driven global regression (referred to herein as HFSDGR), facial component driven group regression (referred to herein as FCDGR), and individual point-pair driven local regression (referred to herein as IPPLDR), or in any a variety of different related combinations. The geometric relationships among landmark point-pairs are used as the discriminative features and as the geometric-invariant constraints to train the final model. In addition, a cascaded regression approach is used which allows far less memory to be used without requiring any kind of compression.

As mentioned above, direct global or local regression is not required. Instead a coarse-to-fine face alignment method is used which flexibly combines holistic face shape driven global regression, facial component driven group regression and individual point-pair driven local regression into a unified framework. The PPIIFs as described consider geometric relationships among landmark point-pairs. As a result geometric-invariant constraints may be introduced into the procedure of progressively learning shape increments from training data. This provides much higher performance.

Shape regression based face alignment methods iteratively learn a feature mapping function and a linear weighting matrix from the training dataset by using linear regression. In use the system should be able to quickly converge on a particular face and to discriminate fine features using the feature space of the training data. However, a full global or local regression tends to be slow. As an example, if all of the landmark increments regarding a face shape are collectively learned at each step of the regression, then the regression becomes very long. There is additional difficulty caused by different face poses, facial expressions, partial occlusions and similar effects in any particular face image. As a result, a human face is a non-rigid object and the relative dimensions and proportions may change even for the same face.

Figure 10:
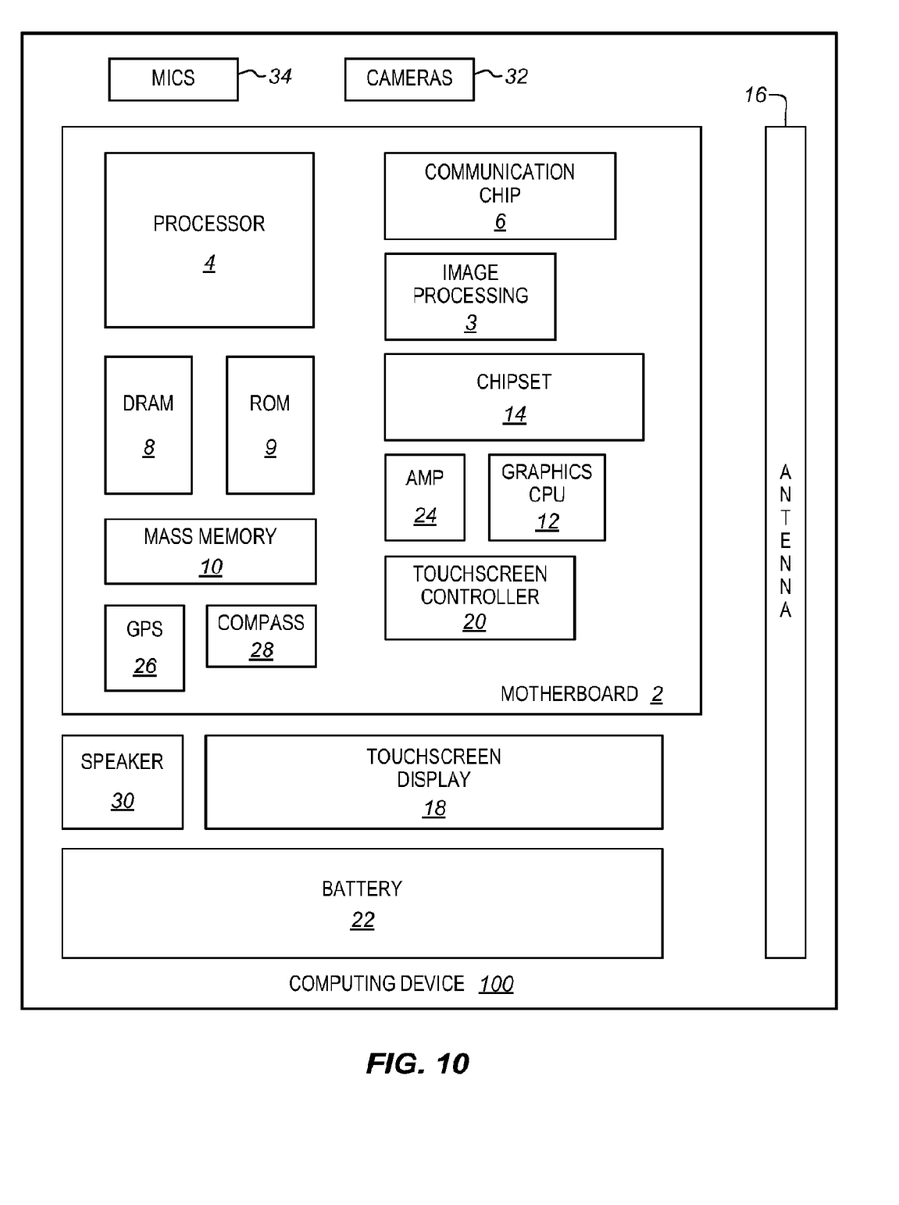
FIG. 10 is a block diagram of a computing device incorporating interactive video presentation according to an embodiment.

FIG. 10 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE. GPRS. CDMA, WiMAX, LTE, Ev-DO, and others.

The cameras 32 are coupled to an image processing chip 36 to perform format conversion, coding and decoding, noise reduction and 3D mapping as described herein. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, tire computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown: nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method of building stages of regression for multiple ferns for a facial landmark detection system that includes performing a first regression on a training set of images using face shapes in the images, performing a first regression on a training set of images using facial component groups in the images, performing a first regression on a training set of images using individual face point pairs in the images to learn shape increments for each respective image in the set of images, building a fern based on the first regression, performing additional regressions on the training set of images using face shapes in the images, using facial component groups; and using individual face point pairs, building additional ferns based on the additional regressions, and combining the ferns to build the facial landmark detection system.

In some embodiments performing a first regression comprises learning variations in the appearance of facial landmarks.

In some embodiments performing a first regression comprises learning variations in the relationship of facial landmarks.

In some embodiments performing a first regression using face shapes in the images comprises calculating shape differences for each image of the set of images as a difference between a normalized ground truth face shape and each face shape of each image, determining a set of candidate point pair indexed image features having the closest correlation to the ground truth face shape, and using the determined top candidate set to build ferns.

In some embodiments performing a first regression comprises first performing a regression using face shapes, then after performing a regression using face shapes, performing a regression using facial component groups, then after performing a regression using facial component groups, performing a regression using individual face point pairs.

In some embodiments using facial component groups comprises dividing facial landmarks into sets of semantic groups according to facial components, wherein each component is separately identified.

In some embodiments using facial component groups comprises learning over each semantic groups separately from each other semantic group.

In some embodiments performing a regression using individual face point pairs comprises considering geometric relationships among landmark point-pairs.

In some embodiments performing a regression using individual face point pairs comprises introducing geometric-invariant constraints while progressively learning shape increments.

In some embodiments using individual face point pairs comprises learning over each pair of face points separately from each other pair of face points.

In some embodiments using individual face point pairs comprises drawing a line between two face points of a pair and determining an index mark on the drawn line.

Further embodiments include normalizing face shape sizes in the images of the set of images.

Some embodiments pertain to a method of locating facial landmark positions in an image that includes receiving an initial image having an initial face shape, applying a fern regression through multiple stages of multiple trained features, the first feature being a face shape, the second feature being facial component groups, and the third feature being individual face point pairs, and identifying facial landmark positions based on the applied fern regressions.

In some embodiments for each stage of the fern regression the positions in the image are incremented to new positions to provide a new face shape after each stage.

In some embodiments applying a fern regression includes applying a first plurality of regression-based ferns to update a face shape in the image, applying a second plurality of regression-based ferns to update groups of facial components in the previous face shape, applying a third plurality of regression-based ferns to update individual face point pairs in the previous face shape, and applying a fourth plurality of regression-based ferns to update fine features of the identified face shape in the previous face shape.

Some embodiments relate to a computing system that includes a memory to store a set of training images, an image sensor to receive an image containing a face, and an imaging processor to receive the set of training images and to build stages of regression for multiple ferns for a facial landmark detection system by performing a first regression on a training set of images using face shapes in the images, performing a first regression on a training set of images using facial component groups in the images, performing a first regression on a training set of images using individual face point pairs in the images to learn shape increments for each respective image in the set of images, building a fern based on the first regression, performing additional regressions on the training set of images using face shapes in the images, using facial component groups and using individual face point pairs, building additional ferns based on the additional regressions, and combining the ferns to build the facial landmark detection system, the imaging processor to store the ferns in a memory accessible to the facial landmark detection system for use on images capture by the image sensor.

In some embodiments performing a first regression using face shapes in the images includes calculating shape differences for each image of the set of images as a difference between a normalized ground truth face shape and each face shape of each image, determining a set of candidate point pair indexed image features having the closest correlation to the ground truth face shape, and using the determined top candidate set to build ferns.

In some embodiments performing a first regression comprises first performing a regression using face shapes, then after performing a regression using face shapes, performing a regression using facial component groups, then after performing a regression using facial component groups, performing a regression using individual face point pairs.

In some embodiments performing a regression using individual face point pairs comprises introducing geometric-invariant constraints while progressively learning shape increments.

In some embodiments using individual face point pairs comprises learning over each pair of face points separately from each other pair of face points, drawing a line between two face points of a pair, and determining an index mark on the drawn line.

The invention claimed is:

1. A machine-readable storage device comprising instructions that, when executed, cause at least one processor to:
    perform a first regression on a training set of images using face shapes in the images, facial component groups in the images, and individual face point pairs in the images, to learn shape increments for ones of the images in the training set of images, performance of the first regression using the facial component groups includes dividing facial landmarks into sets of semantic groups according to facial components;
    build a fern based on the first regression;
    perform additional regressions on the training set of images;
    build additional ferns based on the additional regressions; and
    combine the ferns to build a facial landmark detection system.

2. The machine-readable storage device of claim 1, wherein, to perform the first regression, the instructions cause the at least one processor to learn variations in an appearance of facial landmarks.

3. The machine-readable storage device of claim 1, wherein, to perform the first regression, the instructions cause the at least one processor to learn variations in a relationship of facial landmarks.

4. The machine-readable storage device of claim 1, wherein, to perform the first regression using the face shapes in the images, the instructions cause the at least one processor to:
    calculate shape differences for ones of the images of the training set of images, the shape differences based on differences between a normalized ground truth face shape and face shapes of respective ones of the images;
    determine a set of candidate point pair indexed image features having a closest correlation to the ground truth face shape; and
    use a determined top candidate set from the set of candidate point pair indexed images features to build the ferns.

5. The machine-readable storage device of claim 1, wherein, to perform the first regression, the instructions cause the at least one processor to:
perform a regression using the face shapes;
perform, after the regression using the face shapes, a regression using the facial component groups; and
perform, after the regression using the facial component groups, a regression using the individual face point pairs.

6. The machine-readable storage device of claim 5, wherein, to perform the regression using the individual face point pairs, the instructions cause the at least one processor to consider geometric relationships among landmark point-pairs.

7. The machine-readable storage device of claim 5, wherein, to perform the first regression using the individual face point pairs, the instructions cause the at least one processor to introduce geometric-invariant constraints while progressively learning shape increments.

8. The machine-readable storage device of claim 1, wherein different components of the facial component groups are separately identified.

9. The machine-readable storage device of claim 1, wherein, to perform the first regression using the facial component groups, the instructions cause the at least one processor to learn over ones of the semantic groups separately from other ones of the semantic groups.

10. The machine-readable storage device of claim 1, wherein, to perform the first regression using the individual face point pairs, the instructions cause the at least one processor to learn over of ones of the face point pairs separately from other ones of the face point pairs.

11. The machine-readable storage device of claim 10, wherein, to perform the first regression using the individual face point pairs, the instructions cause the at least one processor to define a drawn line between two face points of a pair and determine an index mark on the drawn line.

12. The machine-readable storage device of claim 1, wherein the instructions further cause the at least one processor to normalize face shape sizes in the images of the training set of images.

13. A machine-readable storage device comprising instructions that, when executed, cause at least one processor to:
obtain an image having a face shape;
apply a fern regression through multiple stages of multiple trained features, a first feature being a face shape, a second feature being facial component groups, and a third feature being individual face point pairs, wherein the facial component groups include divided facial landmarks into sets of semantic groups according to facial components; and
identify one or more facial landmark positions based on the applied fern regression.

14. The machine-readable storage device of claim 13, wherein for each stage of the fern regression the positions in the image are incremented to new positions to provide a new face shape after each stage.

15. The machine-readable storage device of claim 13, wherein, to apply the fern regression, the instructions cause the at least one processor to:
apply a first plurality of regression-based ferns to update the face shape in the image;
apply a second plurality of regression-based ferns to update groups of facial components in the face shape;
apply a third plurality of regression-based ferns to update individual face point pairs in the face shape; and
apply a fourth plurality of regression-based ferns to update fine features of the face shape.

16. A machine-readable storage device comprising instructions that, when executed, cause at least one processor to:
perform a first regression on a training set of images using face shapes in the images, facial component groups in the images, and individual face point pairs in the images, to learn shape increments for respective ones of the images in the training set of images, wherein performance of the first regression using the individual face point pairs includes learning over ones of the face point pairs separately from other ones of the face point pairs;
build a first fern based on the first regression;
perform additional regressions on the training set of images;
build additional ferns based on the additional regressions; and
combine the ferns to build a facial landmark detection system.

17. The machine-readable storage device of claim 16, wherein, to perform the first regression using the face shapes in the images, the instructions cause the at least one processor to:
calculate shape differences for ones of the images of the training set of images, the shape differences based on differences between a normalized ground truth face shape and face shapes of respective ones of the images;
determine a set of candidate point pair indexed image features having closest correlation to the ground truth face shape; and
use a determined top candidate set from the set of candidate point pair indexed images features to build the ferns.

18. The machine-readable storage device of claim 16, wherein, to perform the first regression, the instructions cause the at least one processor to:
perform a regression using the face shapes;
perform, after the regression using the face shapes, a regression using the facial component groups; and
perform, after the regression using the facial component groups, a regression using the individual face point pairs.

19. The machine-readable storage device of claim 18, wherein, to perform the first regression using the individual face point pairs, the instructions cause the at least one processor to introduce geometric-invariant constraints while progressively learning shape increments.

20. The machine-readable storage device of claim 16, wherein the facial component groups include divided facial landmarks into sets of semantic groups according to facial components.

21. An apparatus comprising:
at least one memory;
instructions in the apparatus;
at least one processor to execute the instructions to:
perform a first regression on a training set of images using face shapes in the images, facial component groups in the images, and individual face point pairs in the images, to learn shape increments for ones of the images in the training set of images, performance of the first regression using the facial component groups includes dividing facial landmarks into sets of semantic groups according to facial components;

build a fern based on the first regression;
perform additional regressions on the training set of images;
build additional ferns based on the additional regressions; and
combine the ferns to build a facial landmark detection system.

22. The apparatus of claim 21, wherein, to perform the first regression using the face shapes in the images, the at least one processor is to:
calculate shape differences for ones of the images of the training set of images, the shape differences based on differences between a normalized ground truth face shape and face shapes of respective ones of the images;
determine a set of candidate point pair indexed image features having a closest correlation to the ground truth face shape; and
use a determined top candidate set from the set of candidate point pair indexed images features to build the ferns.

23. The apparatus of claim 21, wherein, to perform the first regression using the individual face point pairs, the at least one processor is to learn over ones of the face point pairs separately from other ones of the face point pairs.

24. The apparatus of claim 23, wherein, to perform the first regression using the individual face point pairs, the at least one processor is to define a drawn line between two face points of a pair and determine an index mark on the drawn line.

25. An apparatus comprising:
at least one memory;
instructions in the apparatus;
at least one processor to execute the instructions to:
obtain an image having a face shape;
apply a fern regression through multiple stages of multiple trained features, a first feature being a face shape, a second feature being facial component groups, and a third feature being individual face point pairs, wherein the facial component groups include divided facial landmarks into sets of semantic groups according to facial components; and
identify one or more facial landmark positions based on the applied fern regression.

26. The apparatus of claim 25, wherein for each stage of the fern regression the positions in the image are incremented to new positions to provide a new face shape after each stage.

27. The apparatus of claim 25, wherein, to apply the fern regression, the at least one processor is to:
apply a first plurality of regression-based ferns to update the face shape in the image;
apply a second plurality of regression-based ferns to update groups of facial components in the face shape;
apply a third plurality of regression-based ferns to update individual face point pairs in the face shape; and
apply a fourth plurality of regression-based ferns to update fine features of the face shape.

28. An apparatus comprising:
at least one memory;
instructions in the apparatus;
at least one processor to execute the instructions to:
perform a first regression on a training set of images using face shapes in the images, facial component groups in the images, and individual face point pairs in the images, to learn shape increments for respective ones of the images in the training set of images, wherein performance of the first regression using the individual face point pairs includes learning over ones of the face point pairs separately from other ones of the face point pairs;
build a first fern based on the first regression;
perform additional regressions on the training set of images;
build additional ferns based on the additional regressions; and
combine the ferns to build a facial landmark detection system.

29. The apparatus of claim 28, wherein, to perform the first regression, the at least one processor is to:
perform a regression using the face shapes;
perform, after the regression using the face shapes, a regression using the facial component groups; and
perform, after the regression using the facial component groups, a regression using the individual face point pairs.

30. The apparatus of claim 29, wherein, to perform the first regression using the individual face point pairs, the at least one processor is to introduce geometric- invariant constraints while progressively learning shape increments.

* * * * *